United States Patent [19]

Swanson

[11] Patent Number: 5,183,877
[45] Date of Patent: Feb. 2, 1993

[54] POLYUREA OR POLYUREA-URETHANE ADHESIVE FOR BONDING ELASTOMERS

[75] Inventor: Sandra K. M. Swanson, West St. Paul, Minn.

[73] Assignee: H.B. Fuller Company, Minneapolis, Minn.

[21] Appl. No.: 782,578

[22] Filed: Oct. 25, 1991

[51] Int. Cl.$^5$ .............................................. C08G 18/10
[52] U.S. Cl. ........................................ 528/64; 528/66; 528/905; 428/423.9; 428/424.2; 428/424.8
[58] Field of Search .................... 528/64, 66, 905; 428/423.9, 424.2, 424.8

[56] References Cited

U.S. PATENT DOCUMENTS

| | | | |
|---|---|---|---|
| 3,755,261 | 8/1973 | VanGulick | 528/60 |
| 3,876,604 | 4/1975 | Caruso | 524/769 |
| 3,888,831 | 6/1975 | Kogon | 528/49 |
| 3,891,606 | 6/1975 | Kogon | 528/65 |
| 3,926,922 | 12/1975 | Baron et al. | 528/64 |
| 3,932,360 | 1/1976 | Cerankowski et al. | 528/64 |
| 3,980,606 | 9/1976 | Werner | 524/775 |
| 4,029,730 | 6/1977 | Schroeder | 152/354 |
| 4,046,743 | 9/1977 | Schonfeld | 528/49 |
| 4,071,279 | 1/1978 | Chung | 264/275 |
| 4,071,492 | 1/1978 | Bethea et al. | 524/775 |
| 4,073,858 | 2/1978 | Chung | 264/262 |
| 4,095,637 | 1/1978 | Krishnan | 152/323 |
| 4,125,522 | 11/1978 | Becker | 528/61 |
| 4,246,392 | 1/1981 | Koike et al. | 528/64 |
| 4,247,676 | 1/1981 | Kimball | 528/49 |
| 4,311,181 | 1/1982 | Hausch | 428/31 |
| 4,327,138 | 4/1982 | Hausch | 428/36 |
| 4,328,322 | 5/1982 | Baron | 521/163 |
| 4,399,852 | 8/1983 | Hausch | 428/36 |
| 4,401,145 | 8/1983 | Hausch | 428/36 |
| 4,434,832 | 3/1984 | Koch | 152/370 |
| 4,435,456 | 3/1984 | Hausch | 428/36 |
| 4,463,155 | 7/1984 | Kibler | 528/61 |
| 4,465,535 | 8/1984 | Fieldhouse et al. | 156/97 |
| 4,485,135 | 11/1984 | Koch | 428/36 |
| 4,485,136 | 11/1984 | Koch et al. | 428/36 |
| 4,504,648 | 3/1985 | Otani et al. | 528/76 |
| 4,515,981 | 5/1985 | Otani et al. | 560/50 |
| 4,517,331 | 5/1985 | Parker et al. | 524/451 |
| 4,537,945 | 8/1985 | Otani et al. | 528/68 |
| 4,544,427 | 10/1985 | Hausch | 156/97 |
| 4,696,332 | 9/1987 | Koch | 152/367 |
| 4,765,852 | 8/1988 | Koch et al. | 156/97 |
| 4,772,676 | 9/1988 | Koch | 528/49 |
| 5,086,153 | 2/1992 | Oyaizu | 528/76 |

OTHER PUBLICATIONS

Lonzacure M-Dipa 4,4'-Methylene-bis(2,6-diisopropylaniline, May, 1989 Lonza, Inc.
Ethacure 300 Curative (CAS 106269-79-3), Nov. 1989, Ethyle Chemicals Group.
Polamine Oligomeric Diamines, Jan. 1991, Air Products Polyurethane Chemical Division.
Polamine Oligomeric Diamines, Jan. 1990, Air Products Polyurethane Chemicals Division.

Primary Examiner—Maurice J. Welsh
Assistant Examiner—Rachel Johnson
Attorney, Agent, or Firm—Oliver F. Arrett

[57] ABSTRACT

An improved two-part adhesive composition utilizing a polyurea or polyurethane/urea prepolymer for improved adhesion to plastics and metals and particularly to elastomers, including EPDM (ethylene-propylene terpolymer from the diene monomer) butyl rubber, neoprene, natural rubber and particularly SBR (styrene-butadiene rubber).

13 Claims, 3 Drawing Sheets

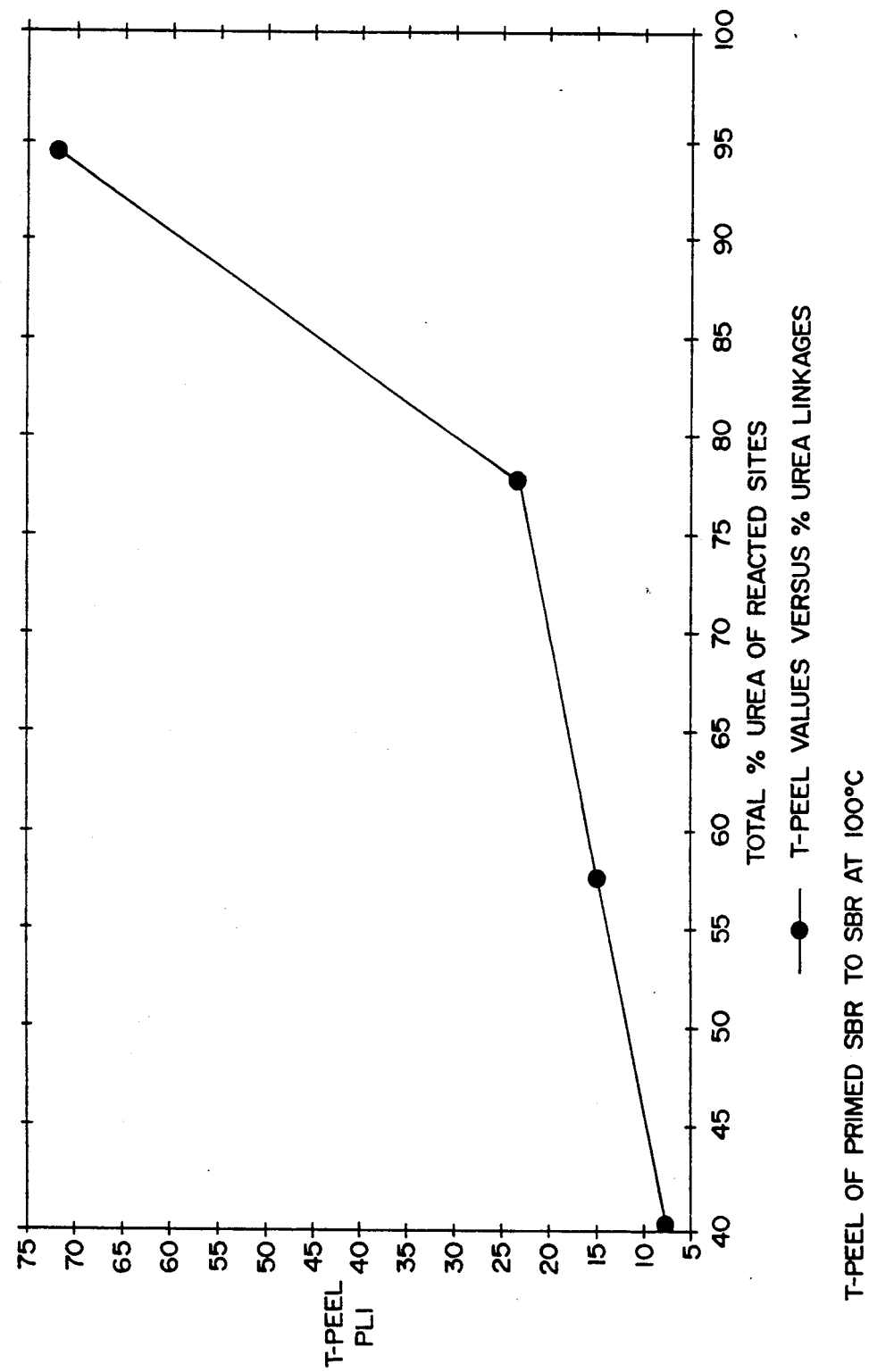

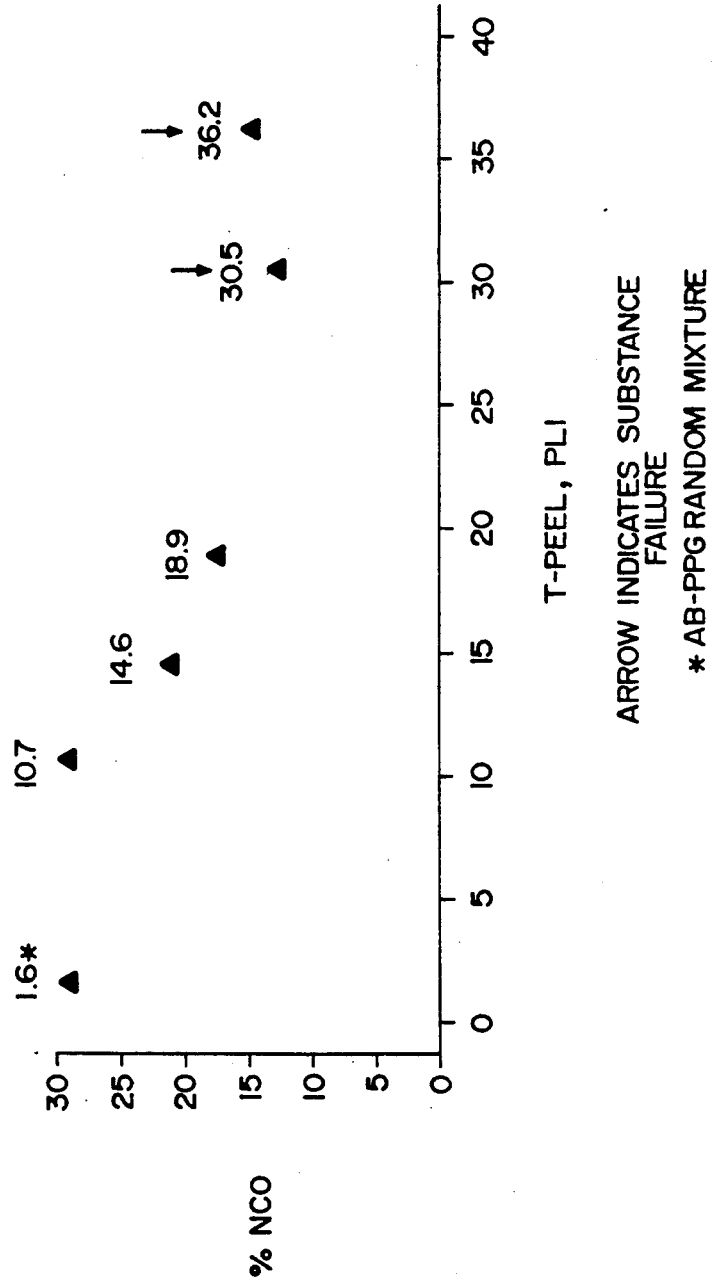

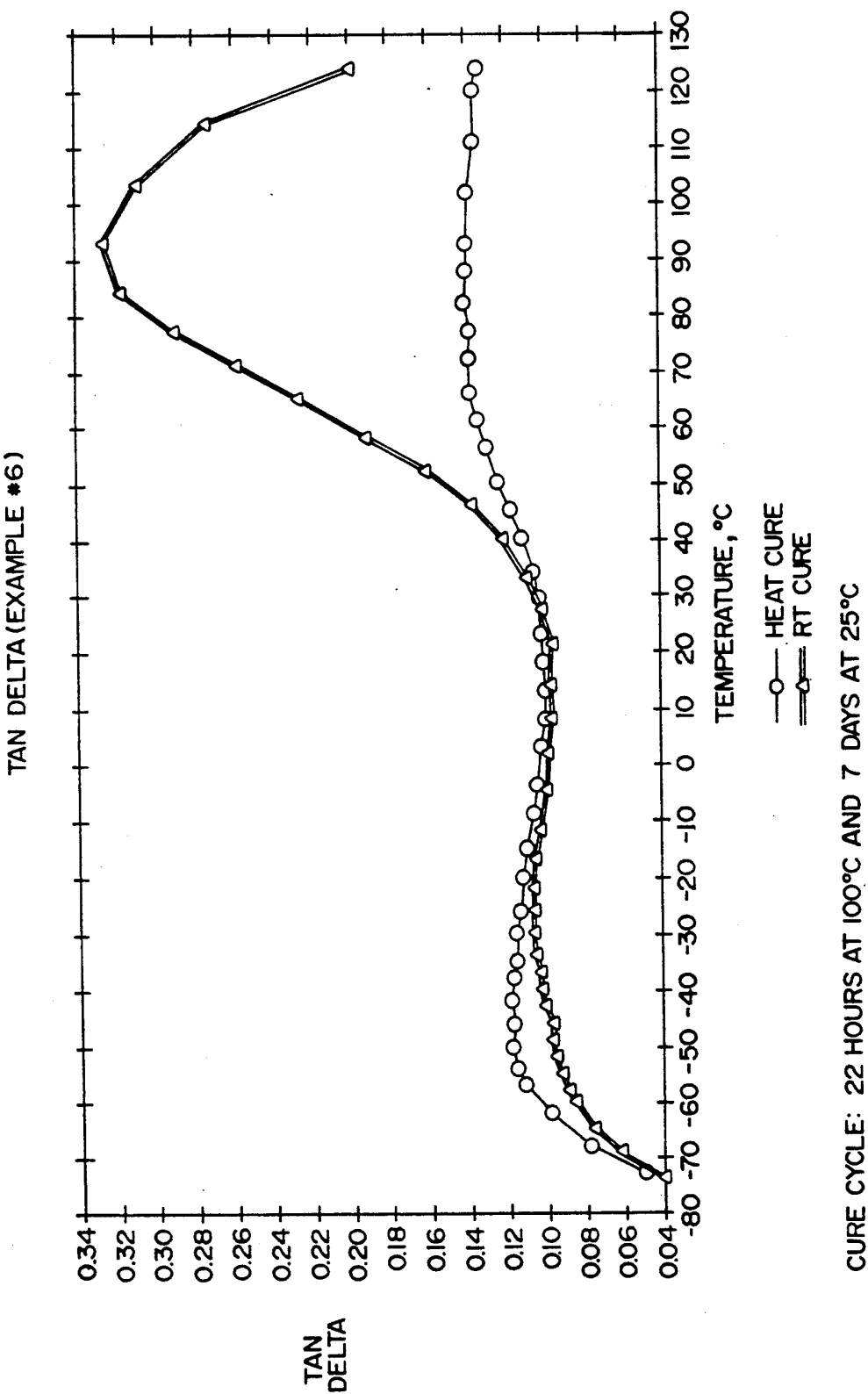

POLYUREA OR POLYUREA-URETHANE ADHESIVE FOR BONDING ELASTOMERS

BACKGROUND OF THE INVENTION

Generally this invention relates to a two-part adhesive composition for use in bonding elastomer articles, the bonded articles per se and the method of using the adhesive therewith. The adhesive is also useful in bonding plastics and metals.

More particularly it relates to use of the adhesive composition in the manufacture of retread tires, particularly truck tires, and the resultant retread tires as articles per se. Additional applications include bonded conveyor belts, molded rubber parts, patch kits for repair of molded rubber articles and the like.

The adhesive is a polyurea based two-component system curable at room temperature or slightly elevated temperatures with outstanding adhesion to molded elastomer articles. It is particularly successful in the manufacture of retread SBR (styrene-butatiene rubber) tires.

Heretofore, retreading has been typically accomplished commercially by use of a urethane-based bonding system which uses uncrosslinked rubber or "cushion gum" cured in an autoclave process. The autoclave process is cumbersome and requires a heat cure of 3 hours at 250° F.

U.S. Pat. No. 3,755,261 to Van Gulick and U.S. Pat. No. 3,876,604 to Caruso disclose a prior art polyurethane/urea system that uses metal halide salts of aromatic diamines to cross-link isocyanate terminated polymers. Specifically disclosed is the use of 4,4'-methylene dianiline/NaCl salt in dioctyl phthalate mixed with an isocyanate terminated prepolymer. When mixed they form a relatively stable mixture at room temperature that can be used as an adhesive. The mixture is activated when heated to 100° C. or above. The salt dissociates and the MDA is then available for reaction with the isocyanate moiety. This forms the final crosslinked polyurethane/urea.

Because the system has to be heated to crosslink, several methods were later developed to initiate the reaction at ambient temperatures or slightly elevated temperatures by lowering the temperature at which the salt dissociates. These are disclosed in the following patents: U.S. Pat. No. 3,888,831 to Kogon describes the use of additive amounts of a polarizable compound such as benzene or a polar compound without reactive hydrogens as accelerators of the above mentioned reaction. The additive acts to dissociate the salt at a lower temperature.

U.S. Pat. No. 3,891,606 Kogon describes the use of active hydrogen donor additives such as alcohols, phenols, polyols, primary and secondary amines, and specifically 1,4-butanediol and glycerol.

U.S. Pat. No. 4,046,743 to Schonfield describes the use of high dielectric compound additives, exclusive of halogens, such as oleic acid, benzaldehyde, adiponitrile, acetic anhydride, polymethylsiloxane and diethyl sulfate having a dielectric constant of 2 or greater. Cure temperature range with these compounds is 30°–140° C.

U.S. Pat. No. 4,435,456 to Hausch describes a process and composition that uses MEK as a dissociation material for the salt.

U.S. Pat. No. 4,517,331 to Parket et al claims the use of pseudo crown ethers having the formula —(y—CH2—CH2)n where y=N,S,O and n is 3 or more.

U.S. Pat. No. 4,772,676 to Koch discloses the use of alcohol catalysts for the acceleration of the salt, -isocyanate prepolymer reaction as an improvement over using ketones.

The following patents teach the application of the above mentioned technology for adhesives:

U.S. Pat. No. 4,125,522 to Becker discloses the use of an MDA salt to crosslink an isocyanate terminated prepolymer as an adhesive used for bonding shoes with application use temperatures to 70° C.

U.S. Pat. No. 4,247,676 to Kimball discloses the use of an MDA salt for crosslinking an isocyanate terminated prepolymer which is catalyzed with a dicarboxylic acid of 4 to 10 carbons for application as an adhesive to bond SMC.

U.S. Pat. No. 4,435,456 to Hausch discloses the use of an MDA salt for crosslinking an NCO terminated prepolymer that uses MEK as a room temperature accelerator for bonding tire treads and making tire patches in the repair of tires. The elastomer is treated with a solution of trichloroisocyanuric acid.

Likewise the following patents address the use of metal halide salts with NCO terminated prepolymers for bonding, patching or otherwise repairing elastomers:

U.S. Pat. No. 4,434,832 to Koch; U.S. Pat. No. 4,485,135 to Koch; U.S. Pat. No. 4,485,136 to Koch et al; U.S. Pat. No. 4,544,427 to Hausch; U.S. Pat. No. 4,696,332 to Koch; U.S. Pat. No. 4,765,852 to Koch; U.S. Pat. No. 4,772,676 to Koch.

The prior art described herein is not satisfactory because of the need to agitate the salt containing material prior to use, the lack of means to eliminate the DOP from the system and the inconsistent cure based on the need to add materials that cause the salt to dissociate at a lower temperature. The use of polyurethane prepolymers also has a negative effect on the adhesion of the system at elevated temperatures as would be encountered in dynamic applications such as tire retreading, tire patching and repair, and conveyor belts.

In the case of the present invention, outstanding adhesion is obtained by using in place of the prior art polyurethane prepolymer a polyurea or mixed polyurethane/urea prepolymer.

As is already known in the art, a surface treatment is required to effectively bond adhesive to any elastomer. The treatment may be accomplished by sulfuric acid etching or by the application of a primer such as those described in U.S. Pat. Nos. 4,485,135 and 4,485,136. A particularly preferred primer for use on SBR (styrene-butadiene rubber) and the like is 2% 1,3-dichloro-5,5-dimethyl hydantoin in methyl chloride. Others are known in the art and may be used in conjunction with this invention.

SUMMARY OF THE INVENTION

The two-component adhesive formulation of the invention comprises a mixture of high molecular polyamines, specifically an aminobenzoate terminated polytetramethyleneglycol (AB-PTMEG) and aromatic diamines for chain extension crosslinked with an isocyanate terminated polyurea prepolymer formed by reacting a polyamine as described above with a diisocyanate.

As already indicated, a primary application of this adhesive is in the bonding of SBR tire tread to SBR tire casings in the tire retreading business. The adhesive composition has outstanding adhesion to primer treated SBR and excellent dynamic performance.

DESCRIPTION OF THE DRAWINGS

FIG. 1 is a graph of experimental data demonstrating the adhesion of the compositions of the invention.

FIG. 2 is a graph showing the relationship of amount of polyurea in the prepolymer to adhesion.

FIG. 3 is a graph showing how the tan delta value changes with temperature relative to cure, tan delta being representative of dynamic stress/strain properties.

DETAILED DESCRIPTION OF THE INVENTION

The two part (Part A and Part B) adhesive composition of the invention is preferably prepared by: Part A—mixing a polyamine with an optional aromatic diamine and Part B—preparing a prepolymer of an isocyanate terminated polyurea. The two parts A and B are combined and cured. Curing may be at ambient temperature or elevated, as desired.

The polyamine of Part A and the precursor of the polyurea prepolymer of Part B are both selected from the class of compounds that are aminobenzoate terminated polymers, such as polypropylene glycol (PPG) or polyethylene glycol (PEG) or hydroxyl terminated polymers that are more fully described in U.S. Pat. Nos. 3,926,922; 3,932,360 and 4,328,322, all of which are incorporated herein by reference. Preferably, the polyamine is an aminobenzoate terminated polytetramethylene glycol (PTMEG) as shown below.

PTMEG-BASED AB TERMINATED OLIGOMERIC DIAMINE

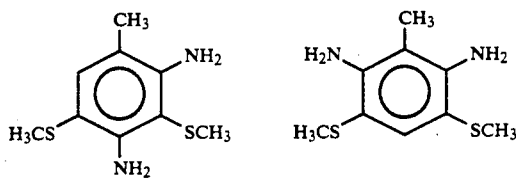

X = ~4 to 40.

These polymers are based on PTMEGs of molecular weight 650, 1000, 2000 and 2900. The number of the AB-PTMEG polymer designates the molecular weight of the PTMEG used in its manufacture. For example, AB-PTMEG-1000 refers to aminobenzoate terminated 1000 mw polytetramethylene glycol.

The aromatic diamines optionally used as chain extenders for Part A include, but are not limited to methylene dianiline (MDA); 4,4' methylene-bis-3-(chloro-2,6-diethylbenzenamine) (MCDEA); diethyltoluenediamine (DETDA); 4,4'-methylene-bis-(2-ethyl-6-methylaniline) NMMEA); 4,4'-methylene-bis-(2,6-diethylaniline) (MDEA); 4,4'-methylene-bis-(2-isopropyl-6-methylaniline) (MMIPA); 4,4'-methylene-bis-(2-ethyl-6-methylcyclohexylamine) (M-MECA); 4,4'-bis(-secbutylamino)diphenyl-methane; phenylenediamine; methylene-bis-ortho-chloroaniline (MBOCA); 4,4'-methylene-bis-(2-methylaniline) (MMA); 4,4'-methylene-bis-(2-chloro-6-ethylaniline) (MCEA); 4,4'-methylene-bis-(2,6-diethylcyclohexylamine) (MDECA); 1,2-bis(2-aminophenylthio)ethane; N,N'-di-alkyl-p-phenylenediamine; 4,4'-bis(para-amino-cyclohexyl)methane; 4,4'-methylene-bis(2,6-diisopropylaniline) (MDIPA); and dimethylthiotoluenediamine (DMTDA).

The preferred aromatic diamines optionally used in Part A are methylene diisopropyl aniline (MDIPA) also known as 4,4'-methylene-bis-(2,6-diisopropylaniline).

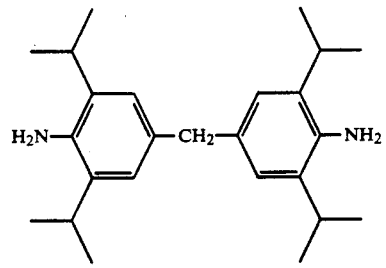

or dimethylthiotoluenediamine (DMTDA) as a mixture of 2,4 and 2,6 isomers.

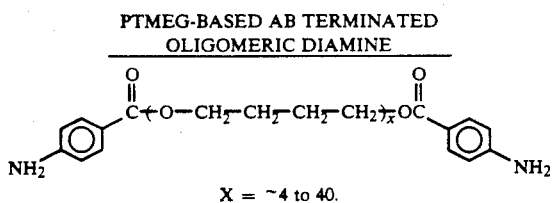

A polyisocyanate is used to form the isocyanate terminated polyurea prepolymer of Part B. Examples of these include: 4,4' methylene diisocyanate (MDI),2,4'-methylene diisocyanate, polymeric MDI, toluene diisocyanates, p- and m-phenylene diisocyanates; tetramethylene diisocyanate, 1,6-hexamethylene diisocyanates, 1,4-cyclohexylene diisocyanate, 4,4'-methylene dicyclohexyl diisocyanate, 4,4'-diphenylmethane diisocyanate, 1,5-napthalene diisocyanate, and 1,5-tetrahydronapthalene diisocyanate. Preferred is a carbodiimide modified methylene diisocyanate (CD-MDI).

Additions of various other constituents known in the art may be made to the basic composition. For example, plasticizers, fillers, pigments, catalysts, and solvents may be added and the stoichiometry may be varied to tailor physical properties, application characteristics and the like.

In the most preferred form of the invention a mixture comprised of two AB-PTMEG diamines of different molecular weight (MW) is made to result in a total formulation average PTMEG MW of 1500. For example, mixing 41.2 wt. % of MW 2000, 43.8 wt. % of MW 1000, and 15.0 wt % aromatic diamine such as MDIPA or DMTDA (the latter being most preferred as it is liquid) would comprise Part A. A preferred form of the polyamine for Part B in forming the prepolymer comprises a mixture of AB-PTMEG-2000 and carobodiimide modified MDI (CD-MDI). Most preferred is a mixture of AB-PTMEG-2000 and AB-PTMEG-1000 at a wt. % of 32.0 and 21.0, respectively, with 47.0 wt. % of the CD-MDI. Such a prepolymer is a soft gel which melts easily into a liquid at 40° C. The total formulation mixture results in an average PTMEG MW of 1500.

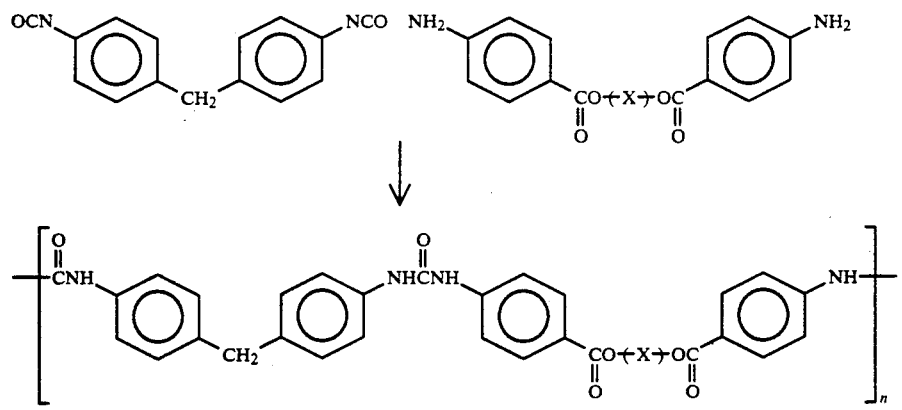

When Part A and Part B are mixed together in a stoichiometric index of about 0.70 to about 1.50 NCO:NH respectively, the resultant material has an adequate workable open time to allow its application to elastomer parts, e.g., a tire carcass and tread. Following its application and adherence of the elastomer parts, it may then be cured at ambient temperatures or at elevated temperatures such as those between ambient and lower than 250° F. The product may be applied by spraying, brushing or extruded bead application.

EXAMPLES

In order to make an adhesive product which is readily useful with meter-mix equipment, the adhesive should preferably have a mix ratio of about 1:1 or about 2:1 by volume. Diisocyanate prepolymers (Part B) made at the appropriate % NCO accomplish this. Those prepolymers which were studied include termination with pure MDI monomer, hydrogenated MDI and carbodiimide modified MDI (CD-MDI). Because polyurea prepolymers of aromatic isocyanates form a solid or gel at ambient temperature, the study also included modification with polyols (PTMEG) to provide a liquid prepolymer. Evaluation was accomplished by preparing lab batches of the prepolymers and observing the adhesion of these prepolymers when crosslinked with a 2:1 mixture of the AB-PTMEG-2000 and AB-PTMEG-1000. The mix ratio of the following Part B prepolymers with this PTMEG mixture was 2:1 (A:B) by volume.

PART B

| Example No. | Formulation (wt %) | | % NCO | Viscosity at 25° C. |
|---|---|---|---|---|
| 1 | CD-MDI | 47.0 | 10.8 (theor.) | Solid- Readily melts with heat |
|   | AB-PTMEG 2000 | 32.0 | | |
|   | AB-PTMEG 1000 | 21.0 | | |
| 2 | CD-MDI | 46.5 | 10.76 (theor.) | 77,000 cps (liquid) |
|   | PTMEG 2000 | 33.3 | | |
|   | AB-PTMEG 1000 | 20.2 | | |

| Adhesive Formulation Part A/Part B | SBR Rubber Adhesive at 82.2° C. |
|---|---|
| AB-PTMEG 1500 mixture/Example No. 1 | 66.4 ± 6.6 pli |
| AB-PTMEG 1500 mixture/Example No. 2 | 43.8 ± 6.4 pli |

It was observed that the addition of PTMEG polyol in Example 2 had a negative effect on adhesion to SBR at elevated temperatures.

Further evaluation was done with respect to diisocyanate prepolymers of AB-PTMEG-2000 in order to lower the melting point of the resulting polyurea prepolymer or at least to prepare a liquid prepolymer by utilizing pure MDI monomer or hydrogenated MDI.

| Example No. | Formulation (wt %) | | % NCO (Theoretical) | Viscosity |
|---|---|---|---|---|
| 3 | CD-MDI | 46.5 | 11.1 | 51,000 cps at 25° C. Slowly solidifies into a gel at 25° C. |
|   | AB-PTMEG 2000 | 53.5 | | |
| 4 | MDI | 59.0 | 11.08% | Formed a gel at 25° C. |
|   | AB-PTMEG 2000 | 41.0 | | |
| 5 | Hydrogenated MDI | 43.0 | 11.16% | Liquid at 25° C. |
|   | AB-PTMEG 2000 | 57.0 | | |

The prepolymer in Example 5 did not cure readily at room temperature with the AB-PTMEG-1500 mixture used in Examples 1 and 2. Peels of the 2:1 by volume products in Example No. 3 and in Example No. 4 were evaluated with the following results:

| Formulation | Rubber Adhesion at 100° C. |
|---|---|
| No. 3 | 11.7 ± 2.5(max.) 5.0 ± 1.4(avg.) |
| No. 4 | 6.20 ± 1.7(max.) 4.6 ± 0.7(avg.) |

No significant improvement was noted with the use of the pure MDI over CD-MDI or hydrogenated MDI.

PART A

With respect to Part A studies, aromatic diamines were added to the AB-PTMEG-1500 mixture to improve performance at high temperatures. The DMTDA was chosen because of slower reactivity due to the hindering effect of the thio groups, as well as the fact that it is a liquid and easier to use.

EXAMPLE NO. 6

| Formulation | Wt % |
|---|---|
| AB-PTMEG-2000 | 41.2% |
| AB-PTMEG-1000 | 43.8% |

| Formulation | Wt % |
| --- | --- |
| DMTDA 300 | 15.0% |

Using Example 6 as Part A and mixing at an isocyanate/amine index of 1.07 with the prepolymer of Example No. 3, the ratio calculates to 100:104 by weight or 1:1 by volume. The resultant product was cured for 7 days at 25° C./50% R.H.

| SBR Rubber Adhesive was determined by T-peel at 100° C. | |
| --- | --- |
| Results: | 12.10 ± 8(max) 11.92 ± 4.2(avg) |

This represents a doubling of the adhesive strength at 100° C. over Examples No. 3 and 4. Testing was done to determine the effect of heat cure on product performance.

| Cure Cycle | 8 hours at 82.2° C. |
| --- | --- |
| Rubber Adhesion at 100° C. | 104.8 ± 8(max) 72.3 +/− 6.0(avg.) |

The effect of heat cure essentially increased the adhesive strength by a factor of 6 and resulted in substrate failure.

Several experiments were carried out to determine the effect of polyurea content on the final adhesion of the system. Two polyol/amine mixtures were made according to the following:

| Mixture I | | Mixture II | |
| --- | --- | --- | --- |
| PTMEG 2000 | 41.2% | AB-PTMEG 2000 | 41.2% |
| PTMEG 1000 | 43.8% | AB-PTMEG 1000 | 43.8% |
| DMTDA | 15.0% | DMTDA | 15.0% |
| Prepolymer I | | Prepolymer II | |
| CD-MDI | 46.5% | CD-MDI | 46.5% |
| PTMEG 2000 | 53.5% | AB-PTMEG-2000 | 53.5% |

These mixtures and prepolymers were interchangeably mixed to produce varying amounts of urea in the final product. Percentage of linkages was calculated by determining the % of equivalents reacted that gives urethane and urea respectively. T-peel was run according to ASTM D 1876 using SBR primed with a 5% solution of 1,3-dichloro-5,5-dimethyl hydantoin in methylene chloride.

| Example No. | Composition | Urethane Linkages | % Urea Linkages | T-Peel @ 100° C. |
| --- | --- | --- | --- | --- |
| 7 | Mixture I Prepolymer I | 53.5% | 40.3% | 7.6 +/− 0.8 pli |
| 8 | Mixture I Prepolymer II | 36.4% | 57.7% | 15.7 +/− 4.4 pli |
| 9 | Mixture II Prepolymer I | 16.5% | 77.4% | 25.3 pli |
| 10 | Mixture II Prepolymer II | 0% | 94.0% | ** 72.3 +/− 0.6 pli |

**Substrate failure of the SBR

A plot of the results is illustrated in the graph of FIG. 1. This shows that increasing the amount of polyurea in the system enhances adhesion.

PREPOLYMER EFFECT ON ADHESION

In order to demonstrate that the polyurea content of the prepolymer has a direct impact on the adhesion of the final product, a series of prepolymers of various urea linkage contents were made up. See Examples 11–14 below. T-peels of SBR to SBR were then bonded with these prepolymer systems as well as with a random mixture of the ingredients and evaluated for adhesive strength of 100° C. and at 88° C. The SBR specimens tested at 100° C. were treated with a 3% solution of 1,3-dichloro-5,5-dimethyl hydantoin in methylene chloride and allowed to sit for 24 hours. They were subsequently rinsed with 1,1,1 trichloroethane to remove any unreacted hydantoin on the surface of the rubber prior to bonding. The experimental compositions are shown in Examples 11–14 and were based on the combinations of the following materials as found in the ultimate adhesion composition i.e., the result of the two-step preparation.

| Material | Functionality | Avg. Equiv. Wt. |
| --- | --- | --- |
| AB-PTMEG-2000 | 2.0 | 900 |
| AB-PTMEG-1000 | 2.0 | 600 |
| DMDTA | 2.0 | 107 |
| CD-MDI | 2.15 | 143 |
| AB-PTMEG 2000G | 2.0 | 948 |
| AB-PTMEG 1000G | 2.0 | 478 |

AB-PTMEG = p-amino benzoate terminated PTMEG
AB-PTMEG G series = p-amino benzoate terminated PPG
DMDTA = dimethylthiotoluene diamine
CD-MDI = carbodiimide modified MDI
in the following base formulation:

| Formulation | Wt % |
| --- | --- |
| AB-PTMEG 2000 | 47.48 |
| AB-PTMEG 1000 | 21.47 |
| DMDTA | 07.35 |
| CD-MDI | 23.70 |
| | 100.00 |

| | Example 11 | Example 12 | Example 13 | Example 14 |
| --- | --- | --- | --- | --- |
| Mixture: | | | | |
| AB-PTMEG 2000 | 40.00 | 35.00 | 30.00 | 25.00 |
| AB-PTMEG 1000 | 21.47 | 21.47 | 21.47 | 21.47 |
| DMDTA | 7.35 | 7.35 | 7.35 | 7.35 |
| | 68.82 | 68.82 | 53.82 | 53.82 |
| Prepolymer: | | | | |
| AB-PTMEG 2000 | 7.48 | 12.48 | 17.48 | 22.48 |
| CD-MDI | 23.70 | 23.70 | 23.70 | 23.70 |
| | 31.18 | 36.18 | 41.18 | 46.18 |
| % NCO (theor.) | 21.2% | 17.6% | 14.91% | 12.80% |
| Actual Measured | 21.2% | 17.72% | 14.99% | 12.9% |
| Results: | 15.0 | 16.5 | 17.7 | 19.0 |
| Avg. T-Peel @ 100° C. | | | | |
| Random Mixture: (no prepolymer) | 9.2 pli | | | |

The specimens tested at 82° C. were treated with a 5% solution of the 1,3-dichloro-5,5-dimethyl hydantoin and bonded within 45 minutes with the adhesive mixtures of Examples 11–14.

Results:

| RESULTS | Example 11 | Example 12 | Example 13 | Example 14 |
|---|---|---|---|---|
| Avg. T-Peel 82° C. | 14.6 | 18.9 | 36.2* | 30.5* |
| Random mixture: | 10.7 ± 1.7 | | | |
| Random Mixture of PPG based PTMEG | 1.6 ± 0.3 pli | | | |

*substrate failure of one of the specimens

The results as shown in FIG. 2 indicate that the amount of urea linkages in the prepolymer backbone has a direct effect on the peel adhesion of the adhesive on SBR that has been treated with an oxidizer such as 1,3-dichloro-5,5-dimethyl hydantoin.

APPLICATIONS

As already indicated, the most useful application of this adhesive is in the bonding of SBR tire tread to SBR tire casings in the tire retreading business. This adhesive has outstanding adhesion to treated SBR and excellent dynamic performance. The initial curing of the adhesive produces a product with adequate strength to allow for handling of the tire. The final cure may be accomplished during the dynamic cycling of the tire as illustrated by the RDS scans of the tan delta after the dynamic cycling for 16 hours at 82.2° C. and 100° C. as shown in FIG. 3. The disappearance of the glass transition's state at the higher temperature is indicative of product cure. The adhesive strength has been determined by testing to be strong enough to cause failure in the SBR before failure of the adhesive.

The retreading procedure to be followed is: (1) removal of used tread from tire casing as in prior art; (2) buffing of tire casing; (3) application of primer; (4) application of adhesive; (5) adhering new tread to tire casing; and (6) cure time.

Cure profiles of the final adhesive product evaluated by dynamic scans via RDS show that the adhesive has a tan delta value that is constant between −50° C. and 122° C. This indicates that the adhesive does not build up heat and degrade by passing through glass transition states during the actual operation of the tire.

BONDING ELASTOMERS

An adhesive evaluation was executed on a variety of elastomers, as shown in the Table below, that had been primed with a solution of 3% dichlorodimethyl-hydantoin. These were then compared to the adhesion values for methylene chloride wiped elastomer surfaces. The product used for this evaluation as identified hereinabove as in Example No. 13.

APPLICATIONS TABLE

| Elastomer | Primer/ Solvent | Room Temperature | pli @ 88° C. |
|---|---|---|---|
| EPDM | Solvent | 100% AF | Not determined |
| EPDM | Primed | 100% SF | 2.4 ± 3.4 (100% AF) |
| Butyl rubber | Solvent | 100% SF | 2.2 ± 1.6 (90% AF; 10% SF) |
| Butyl rubber | Primed | 100% SF | 9.7 ± 1.0 (90% SF; 10% AF) |
| Neoprene | Solvent | 100% AF | 0.6 ± 0.25 (100% AF) |
| Neoprene | Primed | 100% SF | 7.3 ± 4.6 (Mixed AF and SF) |

SF = substrate failure
AF = adhesive failure

This completes the description of the preferred and alternate embodiments of the invention. Those skilled in the art may recognize other equivalents to the specific embodiments described herein which equivalents are intended to be encompassed by the claims attached hereto.

What is claimed is:

1. As a polyurea adhesive composition formed by mixing two parts (A and B) together in predetermined relative amounts, Part A and Part B comprising, respectively:

Part A—a mixture of
 a) a synthetic polymer of di-p-aminobenzoate containing a poly(tetramethyleneglycol) (PTMEG) backbone, and
 b) optionally an aromatic diamine selected from the group consisting of the aromatic diamines used as a chain extender which include but are not limited to methylene dianiline (MDA); 4,4'-methylene-bis-3-(chloro-2,6-diethylbenzenamine) (MCDEA); diethyltoluenedeamine (DETDA); 4,4'-methylene-bis-(2-ethyl-6-methylaniline) (MMEA); 4,4'-bis-(2,6-diethylaniline) (MDEA); 4,4'-methylene-bis-(2-isopropyl-6-methylaniline) (MMIPA); 4,4'-methylene-bis-(2-ethyl-6-methylcyclohexylamine) (M-MECA); 4,4'-bis(sec-butylamino), diphenylmethane; phenylenediamine; methylene-bis-ortho-chloroaniline (MBOCA); 4,4'-methylene-bis-(2-methylaniline) (MMA); 4,4'-methylene-bis-(2-chloro-6-ethylaniline) (MCEA); 4,4'-methylene-bis-(2,6-diethyl cyclohexylamine) (MDECA); 1,2-bis(2-aminophenylthio) ethane; N,N'-dialkyl-p-phenylenediamine; 4,4'-bis(paraaminocyclohexyl) methane; 4,4'-methylene-bis(2,6-diisopropylaniline) (MDIPA); and dimethylthiotoluenediamine (DMTDA).

Part B—an isocyanate terminated polyurea prepolymer formed by mixing
 a) a synthetic polymer of di-p-aminobenzoate containing a poly(tetramethyleneglycol) (PTMEG) backbone with
 b) a diisocyanate selected from the group consisting of 4,4'methylene diisocyanate (MDI); 2,4'-methylene diisocyanate; polymeric MDI; toluene diisocyanates; p- and m-phenylene diisocyanates; tetramethylene diisocyanate; 1,6-hexamethylene diisocyanate; 1,4-cyclohexylene diisocyanate; 4,4'-methylene dicyclohexyl diisocyanate; 4,4'-diphenylmethane diisocyanate; 1,5-naphthalene diisocyanate; carbodimide modified methylene diisocyanate; 1,5-tetrahydronaptha-lene diisocyanate; and mixtures of these.

2. The adhesive composition of claim 1 in which the prepolymer mixture contains an excess of the diisocyanate.

3. The two-part adhesive composition of claim 1 in which the prepolymer includes a mixture of polyurea and urethane linkages.

4. The two-part adhesive composition of claim 1 in which Part A and Part B are mixed in stoichiometic ratio of 0.7 to 1.50 NCO to NH.

5. The adhesive composition of claim 1 in which part A comprises:
   a mixture of the synthetic polymer in two different molecular weights (express with respect to the PTMEG backbone), 1000 and 2000, respectively and an
   aromatic diamine which is an approximate 80:20 mixture of the 2,4- and 2,6-isomers of dimethylthiotoluenediamine (DMTDA) namely 3,5-dimethylthio-2,4-toluenediamine and 3,5-dimethylthio-2,6-toluenediamine.

6. The adhesive composition of claim 5 in which the mixture of synthetic polymer is about 41.2 and 43.8 by weight percent, respectively, and the aromatic diamine is included at about 15 weight percent.

7. The adhesive composition of claim 1 in which Part B comprises a mixture of the synthetic polymer in the different molecular weights (expressed with respect to the PTMEG backbone) 1000 and 2000 respectively to provide a resulting average molecular weight nominally of about 1500, and a diisocyanate is used to form the prepolymer therewith, namely a carbodiimide modified MDI (CD-MDI).

8. The adhesive composition of claim 7 in which the mixture of synthetic polymers is about 32 and 21 by weight percent and the diisocyanate is included at about 47 weight percent.

9. An elastomer article comprised of at least two elements adhesively adhered together by means of an adhesive comprised of a mixture of part A and part B where part A comprises an aminobenzoate terminated polymer and optionally an aromatic diamine and part B comprises an isocyanate terminated polyurea or polyurethane/urea prepolymer comprising the reaction product of a polyisocyanate, an aminobenzoate terminated polymer and optionally a polyol.

10. The article of claim 9 in which the elastomer is SBR, EPDM, neoprene, butylrubber or natural rubber.

11. The article of claim 10 in which the article is a retread tire.

12. The article of claim 9 in which the adhesive is a two-part composition, Part A and Part B comprising, respectively:
   Part A—a mixture of
      a) a synthetic polymer of di-p-aminobenzoate containing a poly(tetramethyleneglycol) (PTMEG) backbone, and
      b) an aromatic diamine (methylene diisopropyl-aniline (MDIPA) or dimethylthiotoluenediamine, and
   Part B—an isocyanate terminated polyurea prepolymer formed by mixing
      a) a synthetic polymer of di-p-aminobenzoate containing a poly(tetramethyleneglycol) (PTMEG) backbone with
      b) a diisocyanate selected from the group consisting of 4,4'-diphenylmethane diisocyanate (MDI), carbodiimide modified MDI (CD-MDI), hydrogenated MDI and mixtures thereof.

13. The two-part adhesive composition of claim 12 in which Part A and Part B are mixed in a stoichiometric ratio of 0.70 to 1.50 NCO to NH.

* * * * *